United States Patent
Niwa et al.

(10) Patent No.: US 9,261,192 B2
(45) Date of Patent: Feb. 16, 2016

(54) CYLINDER HEAD GASKET

(75) Inventors: Takahiro Niwa, Tokyo (JP); Hironobu Imanaka, Hamamatsu (JP); Takeshi Murata, Hamamatsu (JP); Shinya Wasada, Hamamatsu (JP)

(73) Assignee: NICHIAS CORPORATION, Tokyo (JP)

( * ) Notice: Subject to any disclaimer, the term of this patent is extended or adjusted under 35 U.S.C. 154(b) by 0 days.

(21) Appl. No.: 14/007,624

(22) PCT Filed: Mar. 21, 2012

(86) PCT No.: PCT/JP2012/057186
§ 371 (c)(1),
(2), (4) Date: Jan. 24, 2014

(87) PCT Pub. No.: WO2012/133046
PCT Pub. Date: Oct. 4, 2012

(65) Prior Publication Data
US 2014/0123849 A1 May 8, 2014

(30) Foreign Application Priority Data
Mar. 30, 2011 (JP) ................................. 2011-074138

(51) Int. Cl.
*F16J 15/08* (2006.01)
*F16J 10/02* (2006.01)
*F16J 15/02* (2006.01)

(52) U.S. Cl.
CPC *F16J 10/02* (2013.01); *F16J 15/02* (2013.01); *F16J 15/0825* (2013.01); *F16J 15/0831* (2013.01); *F16J 2015/085* (2013.01); *F16J 2015/0862* (2013.01)

(58) Field of Classification Search
CPC ... F16J 15/0818; F16J 15/0825; F16J 15/085; F02F 11/00; F02F 11/002
USPC .................................................. 277/590–598
See application file for complete search history.

(56) References Cited

U.S. PATENT DOCUMENTS 4,971,338 A * 11/1990 Udagawa ....................... 277/595
5,979,905 A * 11/1999 Fischer et al. ................. 277/591
(Continued)

FOREIGN PATENT DOCUMENTS

| CN | 101048588 A | 10/2007 |
| EP | 1 811 162 A1 | 7/2007 |

(Continued)

OTHER PUBLICATIONS

International Search Report for PCT/JP2012/057186, Mailing Date of Jun. 26, 2012.

(Continued)

*Primary Examiner* — Gilbert Lee
(74) *Attorney, Agent, or Firm* — Westerman, Hattori, Daniels & Adrian, LLP

(57) ABSTRACT

A cylinder head gasket includes two main members on two sides, and middle members sandwiched therebetween. The middle members are composed of a first middle member and a second middle member that is separated and distinct therefrom. The first middle member is a metal plate that has cylinder hole rim portions encircling cylinder holes to a particular width, with beads surrounding the cylinder holes being formed in the cylinder hole rim portions. The metal plate either forms separated items, one at each cylinder hole, or else forms an integrated item connected between the cylinder holes. The second middle member is a metal plate that is disposed on the outside of the first middle member and has oil holes and bolt holes. The thickness of the first middle member is greater than that of the second middle member.

6 Claims, 6 Drawing Sheets

(56) References Cited

U.S. PATENT DOCUMENTS

| | | | |
|---|---|---|---|
| 6,089,572 A * | 7/2000 | Plunkett | 277/592 |
| 6,619,666 B1 * | 9/2003 | Tanaka et al. | 277/601 |
| 2007/0090608 A1 * | 4/2007 | Ueta | 277/593 |
| 2007/0090609 A1 * | 4/2007 | Kasuya | 277/598 |
| 2008/0237997 A1 | 10/2008 | Murata et al. | |
| 2009/0200752 A1 * | 8/2009 | Okano | 277/592 |

FOREIGN PATENT DOCUMENTS

| | | |
|---|---|---|
| JP | 08-285080 A | 11/1996 |
| JP | 3049194 B2 | 6/2000 |
| JP | 2003-287135 A | 10/2003 |
| JP | 2003-287137 A | 10/2003 |
| JP | 2005-127404 A | 5/2005 |
| JP | 2006-125312 A | 5/2006 |
| JP | 2007-064449 A | 3/2007 |
| JP | 2008-202422 A | 9/2008 |
| JP | 2003-227569 A | 8/2009 |
| JP | 2010-084937 A | 4/2010 |
| JP | 2010-203379 A | 9/2010 |

OTHER PUBLICATIONS

Extended European Search Report dated Mar. 24, 2015, issued in EP Patent Application No. 12764187.6 (7 pages).

English Translation of Office Action issued in counterpart Chinese Patent Application No. 2012800163050 (7 pages).

* cited by examiner

US 9,261,192 B2

CYLINDER HEAD GASKET

TECHNICAL FIELD

The present invention relates to a cylinder head gasket that is inserted between the cylinder block and cylinder head of the engine in an automobile or the like.

BACKGROUND ART

Due to the lowered fuel consumption and increased output of engines in recent years, the temperature and pressure inside the combustion chamber are on a rising trend. More precisely, the maximum explosion pressure of the engine is on a rising trend, and meanwhile the mechanical strength of the engine is tending to fall as it becomes more lightweight. As a result, during explosions inside the cylinder, the cylinder head lift is large, and the cylinder head gasket is required to have following ability with regard to that lift. If the following ability of the cylinder head gasket with regard to the cylinder head lift falls, seal leakage will occur. Another requirement is for the cylinder head lift to be restrained via the gasket.

A known method of resolving this is to make the thickness of the gasket at the cylinder hole rim portions greater than that at the other portions and increase the clamping force per unit area on the cylinder hole rim portions, so as to raise the sealing performance and restrain the amount of lift.

JP-A-8-285080 discloses a single-plate cylinder head gasket that has elastic metal plate as its material. The metal plate is formed in a particular shape to encircle each cylinder bore rim portion to an appropriate width; the remainder portion of the gasket—the portion other than the cylinder bore rim portions—is made thinner than the cylinder bore rim portions and is formed from metal plate of high hardness; and the gasket remainder portion and the cylinder bore rim portions are fitted together and the joining portions laser welded.

RELATED-ART DOCUMENT

Patent Document

Patent Document: JP-A-8-285080

SUMMARY OF THE INVENTION

Problems to be Solved by the Invention

In JP-A-8-285080 however, because the fitting together of the gasket remainder portion and the cylinder bore rim portions is carried out by laser welding, the thickness of the gasket remainder portion cannot be made very small, and in the embodiment is only 0.2 mm, which makes a 0.05 mm difference from the thickness of the cylinder bore rim portions. With a single-plate gasket and such thickness difference, the following ability of the cylinder head gasket with regard to the large cylinder head lift of recent years cannot be said to be adequate. In addition, a reduction in the material that composes the gasket is also being sought, as a part of the move to lighter weight. Thus, what is desired is the development of a cylinder head gasket that has superior following ability with regard to cylinder head lift, and furthermore can restrain the amount of cylinder head lift via the gasket and reduce the amount of material.

An object of the present invention is therefore to provide a cylinder head gasket that has superior following ability with regard to cylinder head lift, and furthermore can restrain the cylinder head lift via the gasket and reduce the amount of material.

Means for Solving the Problems

Given such circumstances, the present inventors conducted diligent investigations, as a result of which they arrived at the present invention when they discovered that by using for the middle member—which is sandwiched between main members on two sides—a metal plate with cylinder hole rim portions that encircle the cylinder holes to a particular width (first middle member), and a metal plate that is disposed outward from the first middle member and has oil holes and bolt holes (second middle member), and by making the first and second middle members separated, distinct members, so that the first middle member can be made thicker than the second middle member, it is possible to obtain a cylinder head gasket that has superior following ability with regard to the cylinder head lift, and furthermore can restrain the cylinder head lift via the gasket and reduce the amount of material.

According to a first aspect of the invention, a cylinder head gasket includes: a cylinder head-side main member, a cylinder block-side main member, and middle members that are sandwiched between the cylinder head-side main member and the cylinder block-side main member. The middle members are composed of a first middle member and a second middle member that is separated and distinct from the first middle member. The first middle member is a metal plate that has cylinder hole rim portions encircling the cylinder holes to a particular width, with beads surrounding the cylinder holes being formed in the cylinder hole rim portions. The metal plate either forms separated items, one at each cylinder hole, or else forms an integrated item connected between the cylinder holes. The second middle member is a metal plate that is disposed on the outside of the first middle member and has oil holes and bolt holes. The thickness of the first middle member is greater than that of the second middle member.

Effects of the Invention

With this invention, thanks to a large-thickness middle member (shim plate) being interposed between the main members at the two sides, the cylinder head lift can be restrained. Because there are three or more middle members—which are provided with beads at the cylinder bore rim portions—laid over each other, only a small amount of following per individual plate is needed with regard to the flange gap, and thus the following ability of the gasket is improved. In addition, because the first and second middle members are separated, distinct members, the first middle member can be made thicker than the second middle member by 0.07 mm or more, and furthermore the degree of design freedom is raised. Thanks to this, the clamping force per unit area on the cylinder bore rim portions can be increased, and the sealing performance is improved. The first and second middle members are used only for the necessary portions and therefore a reduced amount of material can be used for them.

DESCRIPTION OF EXEMPLARY EMBODIMENTS

Figure 1:
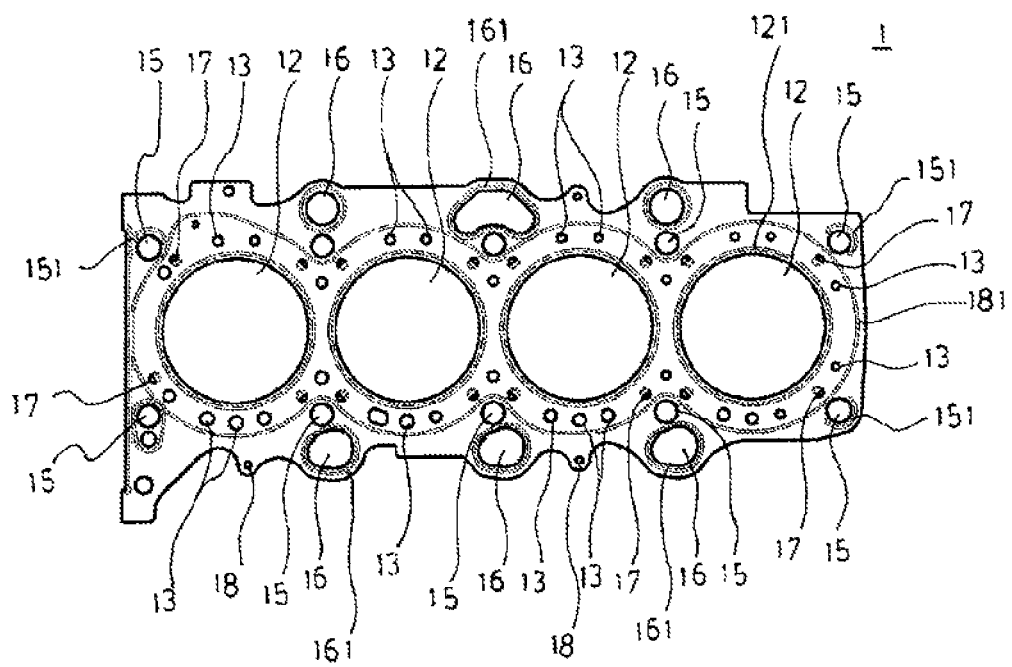
FIG. 1 is a plan view of the main member on the block side of a cylinder head gasket in an embodiment of the invention.
Figure 2:
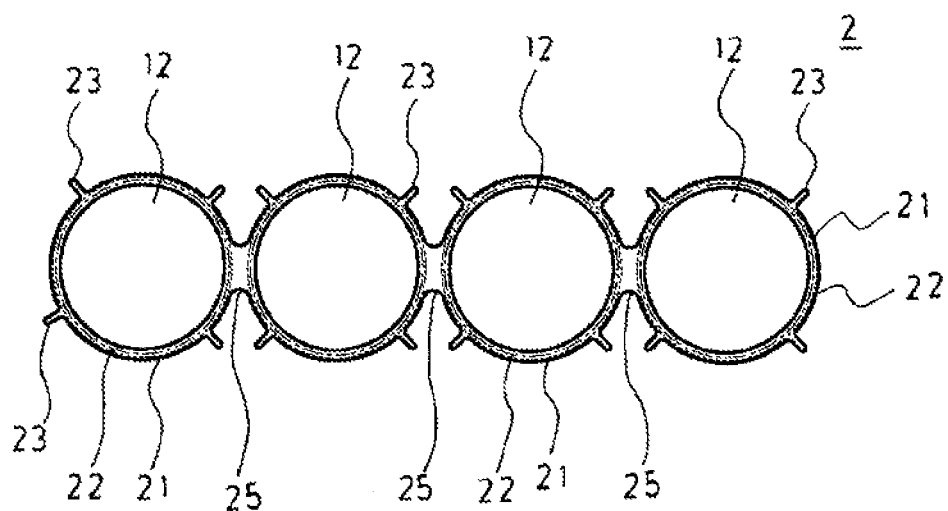
FIG. 2 is a plan view of a first middle member of the cylinder head gasket in the embodiment.
Figure 3:
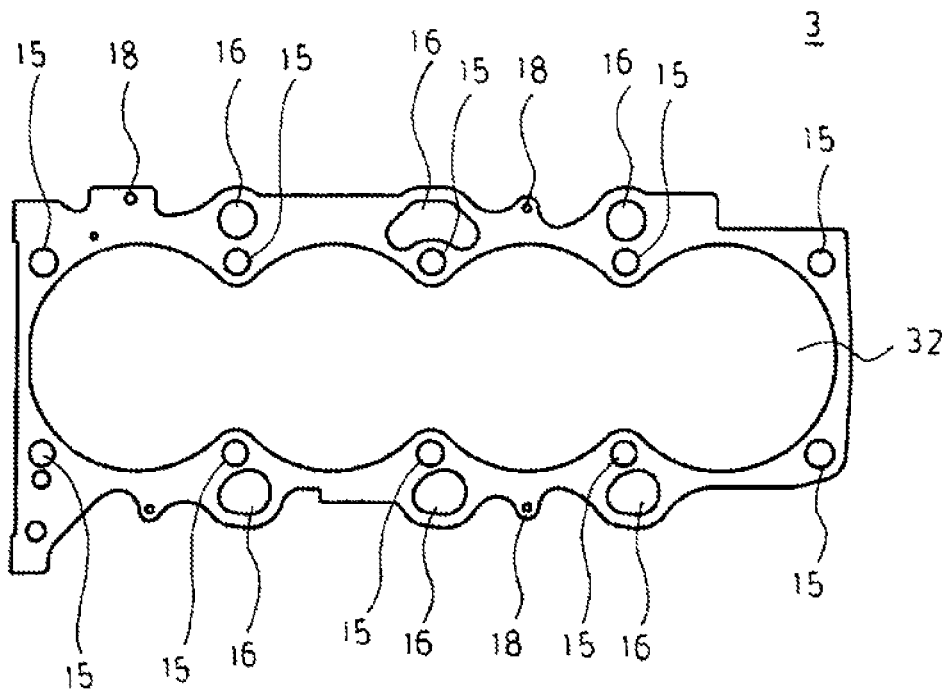
FIG. 3 is a plan view of a second middle member of the cylinder head gasket in the embodiment.
Figure 4:
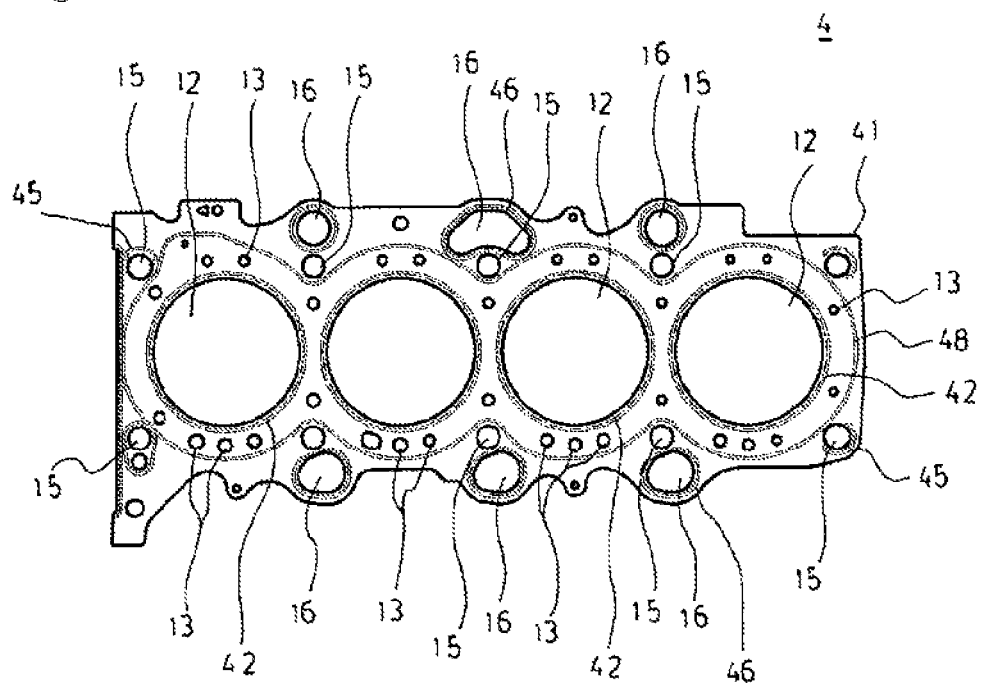
FIG. 4 is a plan view of the main member on the cylinder head side of the cylinder head gasket in the embodiment.

A cylinder head gasket (sometimes abbreviated to "gasket" below) in an exemplary embodiment of the invention will now be described with reference to the accompanying FIGS. 1 to 14. The parts enclosed in solid lines in FIGS. 1, 2, and 4 to 6 are beads.

A gasket 10 of an embodiment of the invention is used as a sealing member for the joining faces of the cylinder block and cylinder head, and consists of a cylinder block-side main member 1, a cylinder head-side main member 4, and middle members that are sandwiched between the main members 1 and 4. The middle members are composed of a first middle member 2 and a second middle member 3 that is separated and distinct from the first middle member 2. Note that "separated" means that the members have no places that contact or overlap each other, and are spatially apart. Although in this example the cylinder block-side main member 1 and the cylinder head-side main member 4 are both single-plate items, they are not limited to this and each could alternatively consist of two or more plates laid over each other.

The cylinder block-side main member 1 is shown in FIG. 1. The profile shape of the main member 1 roughly corresponds to that of the joining faces of the cylinder block and cylinder head. The main member 1 has: cylinder holes 12; multiple relatively small-diameter cooling water holes 13 around the cylinder holes 12; relatively large-diameter oil holes 16 disposed outward from the cooling water holes 13; bolt holes 15 formed at 90 degree intervals around the cylinder holes; latching holes 17 into which the latching tangs 23 latch and that are positioned inward from the bolt holes 15; and screw holes 18 for fixing the main members 1 and 4 and the second middle member 3. The screw holes 18 are located outside the profile of the joining faces of the cylinder block and cylinder head.

In the main member 1 there are formed beads 121 that surround the cylinder holes 12 at the cylinder hole 12 rim portions, beads 161 that surround the oil holes 16 at the oil hole 16 rim portions, and beads 181 that surround the four cylinder holes 12 from further outward. Further, either the bolt holes 15 have located around them the beads 181 and the beads 161 that surround the oil holes 16, or else beads 151 are formed that surround the bolt holes 15. The height of the beads in the main member 1 is, say, on the order of 0.05 to 0.3 mm. In shape, the beads in the main member 1 can be either full beads with a mound-like cross section or half heads with a stepped shape such as indicated by reference numeral 161 in FIG. 11 or reference numeral 151 in FIG. 12. In this example, the beads 121 that surround the cylinder holes 12 are fill beads and the beads 181 that surround the oil holes are half beads.

The cylinder head-side main member 4 is shown in FIG. 1. The points of difference between the main member 4 and the main member 1 are that in the main member 4 there are not formed any latching holes 17 into which the latching tangs 23 of the first middle member 2 latch, and the beads are formed so as to be symmetrical in the thickness direction, except those at the cylinder hole 12 rim portions. It suffices to form the latching holes 17, into which the latching tangs 23 of the first middle member 2 latch, either in the main member 1 or in the main member 4, and so in this example the latching holes are not needed in the main member 4. The following ability of the gasket with regard to the cylinder lift is improved by the beads being formed so as to be symmetrical in the thickness direction, except those at the cylinder hole rim portions 21. In addition, because the first middle member 2 is interposed, the cylinder hole rim portions 21 benefit from the advantages of the invention even though the beads are the same in the thickness direction.

The main members 1 and 4 could be, say, composite members composed of a steel plate with rubber material formed on one or both sides. The steel plate could be, for example, a stainless steel plate, SPCC steel plate, aluminum steel plate or the like. Commonly known methods could be used for forming the steel plate and rubber material and for forming the rubber material onto the steel plate.

The first middle member 2 is an integrated metal plate that is connected between the cylinder holes 12 and has cylinder hole rim portions 21 encircling the cylinder holes to a particular width, with beads 22 surrounding the cylinder holes 12 being formed in the cylinder hole rim portions 21. More precisely, the four cylinder hole rim portions 21 are connected serially by connecting portions 25, and thereby integrated. The thickness of the first middle member 2 is 0.15 to 0.30 mm, more preferably 0.20 to 0.25 mm, and still more preferably 0.2 mm. In this way, although the thickness of the first middle member 2 will have to be adjusted in consideration of the gasket following ability, the fact that this member is made a separate member from the second middle member 3 means that a large step difference can be made between this member and the second middle member 3, and thus the clamping force per unit area on the cylinder hole rim portions can be increased. For the metal plate that constitutes the first middle member 2, the SUS301H material prescribed in standard JIS G 4313 can be used. The height of the beads in the first middle member 2 will be, say, on the order of 0.05 to 0.30 mm. The beads in the first middle member 2 will be full or half beads; in this example they are full beads. The first middle member 2 is not limited to being an integrated item in which the four cylinder hole rim portions 21 are connected serially by connecting portions 25; it could alternatively be an item in which the connecting portions 25 are omitted and the four cylinder hole rim portions 21 are disposed separated, one at each cylinder hole 12.

Figure 14:
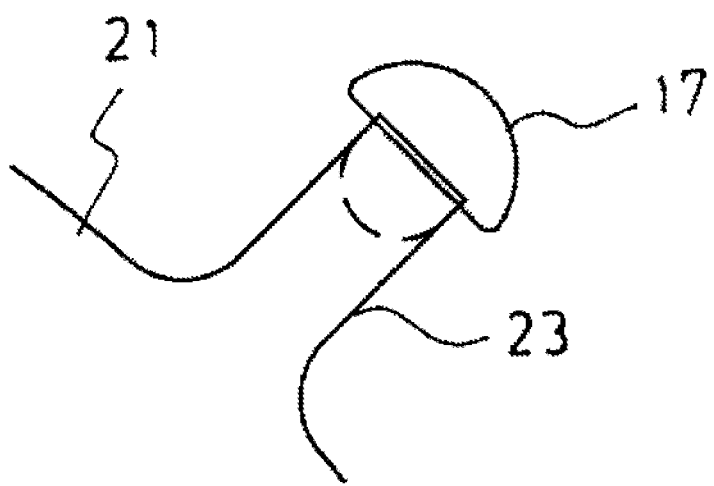
FIG. 14 is an enlarged view of portion X in FIG. 5.

In the first middle member 2 there are formed latching tangs 23 that project outward from the periphery of the cylinder hole rim portions 21. Thanks to this, latching into the latching holes 17 of the main member 1 can be effected. More precisely, the latching tangs 23 are inserted into the latching holes 17 and bent in the opposite direction to latch them in place, as shown in FIG. 14. Note that the first middle member 2 could alternatively be made to latch to the main member 4. In that case, the latching holes 17 would be formed in the main member 4.

The second middle member 3 has: oil holes 16 disposed outward from the first middle member 2; bolt holes 15; and screw holes 18 for fixing together with the main members 1 and 4. The central part of the second middle member 3 constitutes a through-hole 32 that is sufficiently large for the first middle member 2 to enter therein but remain separated from the second middle member 3. In other words, the cylinder holes 12 and cooling water holes 13 will be positioned in the through-hole 32.

The thickness of the second middle member 3 will be smaller than that of the first middle member 2 by at least 0.07 mm, preferably by 0.08 mm or more, and more preferably by 0.09 to 0.12 mm. In this way, with the thickness of the second middle member 3 made small, it will be possible to make the step difference with the first middle member 2 large, and thereby to increase the clamping force per unit area on the cylinder hole rim portions. For the metal plate that constitutes the first middle member 2, steel plate of SPCC or the SUS30 material prescribed in standard JIS G 4313 can be used. Beads may be formed on the second middle member 3, or may equally well not be formed on it; in this example it is a flat plate with no beads formed on it. Beads are formed at the oil hole 16 rim portions of the main members 1 and 4, and so the clamping force on the oil hole 16 rim portions will be raised even when no beads are formed on the second middle member 3.

Figure 5:
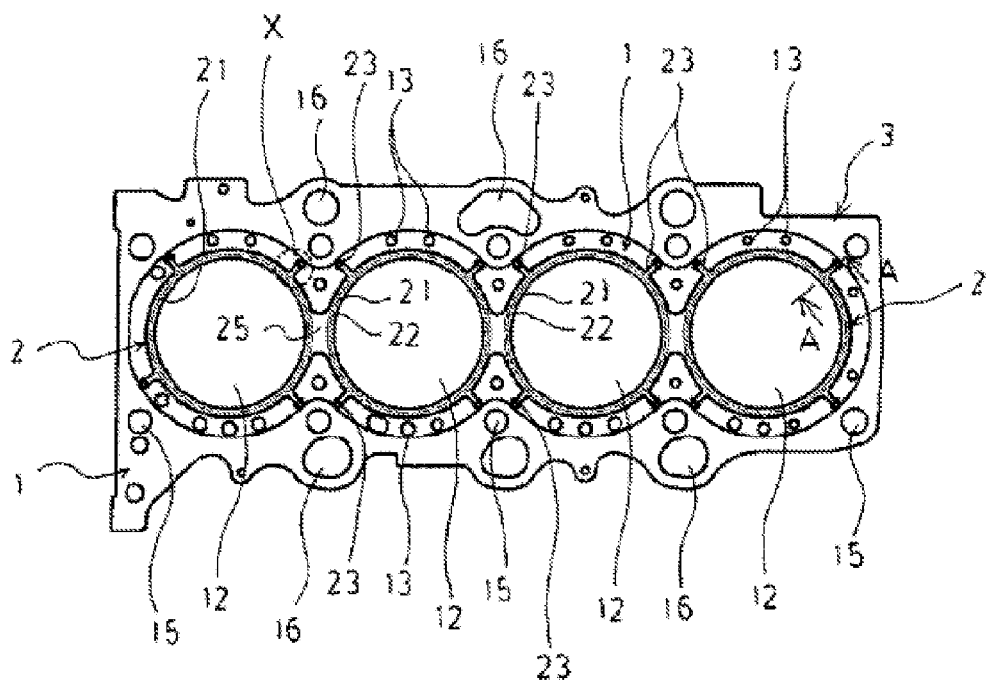
FIG. 5 is a plan view of the two middle members fitted into the main member on the block side of the cylinder head gasket in the embodiment.
Figure 6:
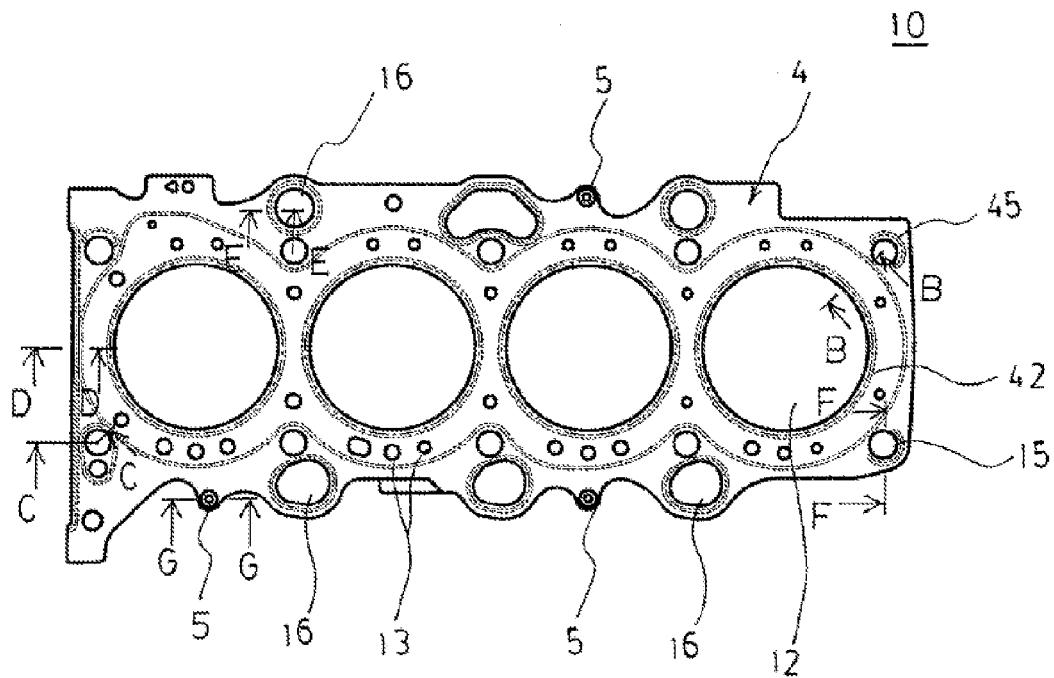
FIG. 6 is a plan view of the cylinder head gasket in the embodiment of the invention.
Figure 7:
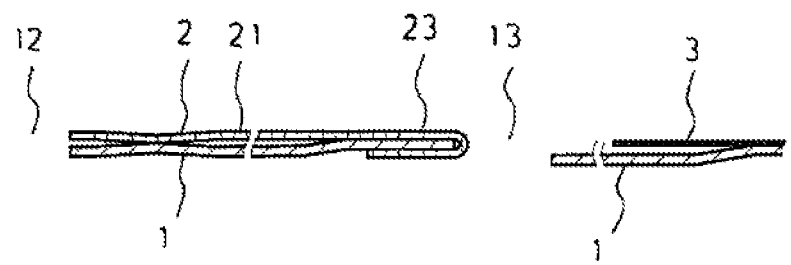
FIG. 7 is a cross-sectional view along line A-A in FIG. 5.

FIG. 5 shows the arrangement of three members: the main member 1, the first middle member 2 and the second middle member 3. More precisely, the latching tangs 23 of the first middle member 2 are latched into the latching holes 17 of the main member 1. The second middle member 3 is screwed to the main member 4 in the manner shown in FIG. 6. Further, the cylinder holes 12 and cooling holes 13 are positioned in the through-hole 32 part of the second middle member 3. In this way, the first middle member 2 and second middle member 3 are separated, without any connection, and are used only for the necessary portions, which means that a reduced amount of material can be used for them. By fitting the cylinder head-side main member 4 to the 2-layer structure in FIG. 5, a 3-layer structure gasket of the invention, composed of the two main members 1 and 4 shown in FIG. 6 and the first and second middle members 2 and 3, is obtained.

Figure 8:
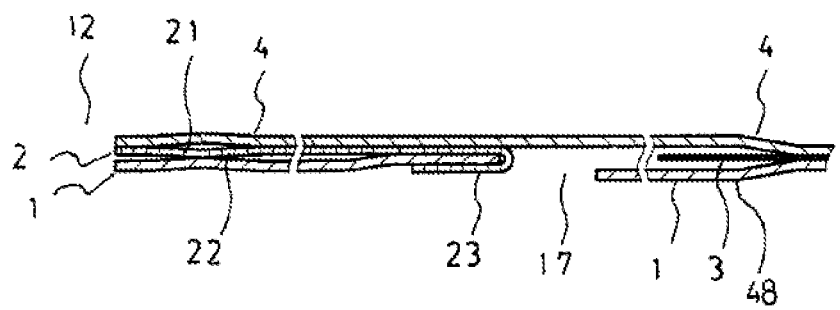
FIG. 8 is a cross-sectional view along line B-B in FIG. 6.
Figure 9:
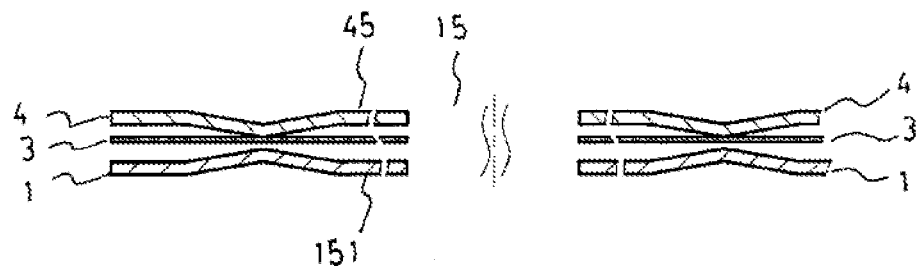
FIG. 9 is a cross-sectional view along line C-C in FIG. 6.
Figure 10:
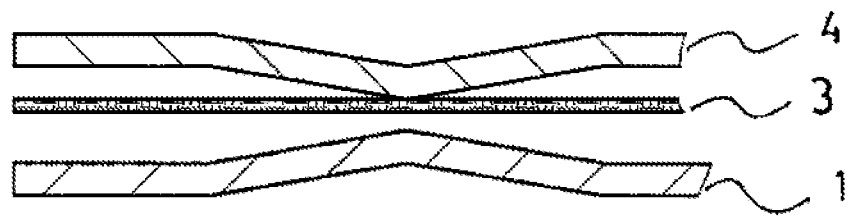
FIG. 10 is a cross-sectional view along line D-D in FIG. 6.

The gasket 10, as shown in FIG. 8, has a 3-layer structure composed of three plates—namely the main members 1 and 4 and the first middle member 2—with beads formed at the cylinder hole rim portions that encircle the cylinder holes 12 to a particular width. Tests have demonstrated that the following ability of the gasket with regard to the flange lift improves when the number of beaded plates laid over each other is increased. This means that with this gasket 10, only a small amount of following per individual plate is needed with regard to the flange gap, and so the following ability of the gasket is improved.

With this gasket 10, the thickness of the first middle member 2 (shim) will be large at the cylinder hole rim portions. Tests have demonstrated that in the case of gaskets that have a shim plate interposed between two main members with full beads formed on them, the greater the thickness of the shim plate, the greater will be the ability to restrain the head lift. This means that with this gasket 10, the flange lift can be restrained via the gasket. Because the first and second middle members 2 and 3 are separated, distinct members, the thickness of the first middle member 2 can be made larger than that of the second middle member 3, and hence the clamping force per unit area on the cylinder hole rim portions can be increased and the sealing performance improved. In addition, the first and second middle members are used only for the necessary portions and therefore a reduced amount of material can be used for them.

Figure 11:
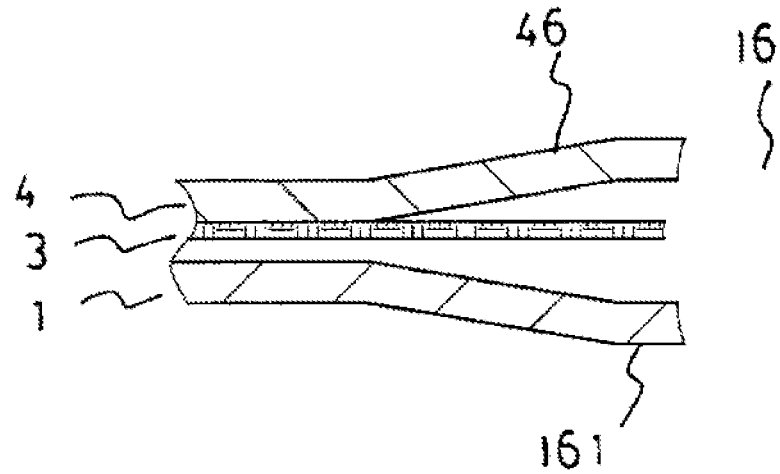
FIG. 11 is a cross-sectional view along line E-E in FIG. 6.
Figure 12:
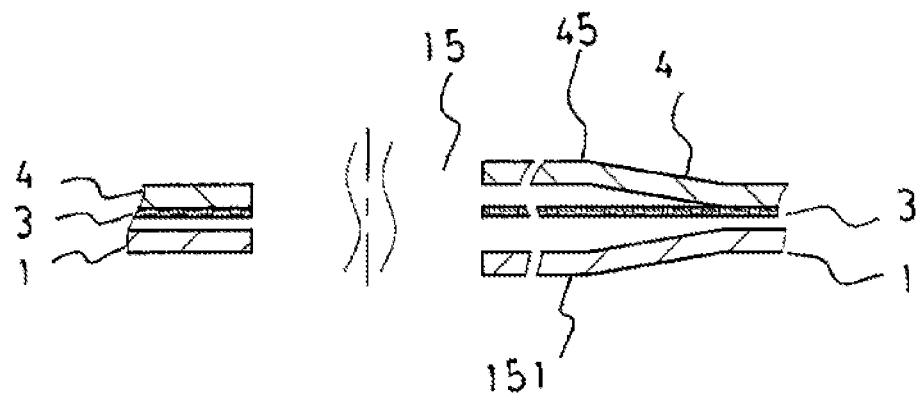
FIG. 12 is a cross-sectional view along line F-F in FIG. 6.
Figure 13:
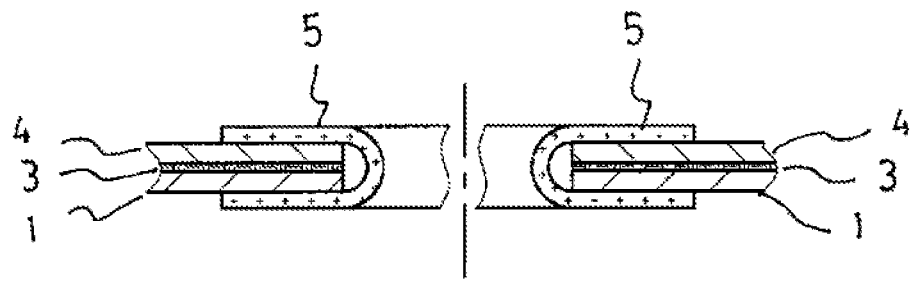
FIG. 13 is a cross-sectional view along line G-G in FIG. 6.

The oil hole rim portions, as shown in FIG. 11, have a 3-layer structure composed of three plates, namely the main members 1 and 4 and the second middle member 3, which have full beads formed on them. Because the pressure of the oil that flows through the oil holes 16 is lower than the cylinder pressure, this is sufficient for sealing the oil holes.

The cylinder head gasket of the invention is not limited to the foregoing embodiment, but could alternatively be, say, an item with multiple metal-plate first middle members 2 laid over each other, in which beads 22 that surround the cylinder holes 12 are formed at the cylinder hole rim portions 21. In that case too, it will be preferable to make the thickness of the multiple metal plates larger than that of the second middle member by 0.07 mm or more, the same as in the case of a single metal plate. In the case where the gasket is an item with multiple first middle members 2 laid over each other the difference in thickness relative to the second middle member 3 can easily be made large. Because there will be four or more middle member plates laid over each other and provided with beads at the cylinder hole rim portions, only a small amount of following per individual plate will be needed with regard to the flange gap, and thus the following ability of the gasket will be improved.

INDUSTRIAL APPLICABILITY

The invention enables restraint via the cylinder head gasket with regard to the large lift of the cylinder head, during explosions inside the cylinder having resulted from the lowered fuel consumption and increased output of engines in recent years. The invention also enables superior following ability with regard to such lift. Hence, the invention can contribute to lowering fuel consumption and increasing output, and furthermore can assist in saving resources.

LIST OF REFERENCE SYMBOLS

1: cylinder block-side main member
2: first middle member
3: second middle member
4: cylinder head-side main member
5: screw
10: gasket
12: cylinder hole
13: cooling water hole
15: bolt hole
16: oil hole
17: latching hole
18: screw hole
21: cylinder hole rim portion
22, 42, 121: full beads around cylinder holes
23: latching tang
46, 161: half beads around oil holes
48, 181: half beads

The invention claimed is:

1. A cylinder head gasket, comprising:
a cylinder head-side main member,
a cylinder block-side main member, and
middle members that are sandwiched between the cylinder head-side main member and the cylinder block-side main member;
the middle members being composed of a first middle member and a second middle member that is separated and distinct from the first middle member, the first middle member being a metal plate that includes cylinder hole rim portions encircling cylinder holes to a particular width, latching tangs that project outward from a periphery of the cylinder hole rim portions, and beads surrounding the cylinder holes being formed in the cylinder hole rim portions, the metal plate either forming separated items, one at each cylinder hole, or else forming an integrated item connected between the cylinder holes, the first middle member being latched by the latching tangs being inserted and bent into latching holes either in the cylinder head-side main member or in the cylinder block-side main member, the second middle member being a metal plate that is disposed on the outside of the latching tangs of the first middle member and has an oil hole and a bolt hole, and the thickness of the first middle member being greater than that of the second middle member.

2. The cylinder head gasket according to claim 1, wherein the cylinder head-side main member is either a single-plate item or an item composed of two or more plates laid over each other.

3. The cylinder head gasket according to claim 2, wherein the cylinder block-side main member is either a single-plate item or an item composed of two or more plates laid over each other.

4. The cylinder head gasket according to claim 1, wherein the cylinder block-side main member is either a single-plate item or an item composed of two or more plates laid over each other.

5. The cylinder head gasket according to claim 1, wherein the first middle member is an item composed of multiple metal plates laid over each other, with beads that surround the cylinder holes being formed at the cylinder hole rim portions, and the total thickness of the plates is larger than the thickness of the second middle member by 0.07 mm or more.

6. The cylinder head gasket according to claim 1, wherein both the cylinder head-side main member and the cylinder block-side main member are composite members composed of a steel plate with rubber material formed on one or both sides, and both have beads that surround the cylinder holes.

* * * * *